United States Patent
Lauridsen et al.

(10) Patent No.: US 12,538,156 B2
(45) Date of Patent: Jan. 27, 2026

(54) UTILIZING USER EQUIPMENT (UE) DETECTION OF RADIO STATE CONDITIONS

(71) Applicant: Nokia Technologies Oy, Espoo (FI)

(72) Inventors: Mads Lauridsen, Gistrup (DK); Jeroen Wigard, Klarup (DK); Rafhael Medeiros De Amorim, Aalborg (DK); Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 361 days.

(21) Appl. No.: 18/246,558

(22) PCT Filed: Sep. 16, 2021

(86) PCT No.: PCT/EP2021/075460
§ 371 (c)(1),
(2) Date: Mar. 24, 2023

(87) PCT Pub. No.: WO2022/078703
PCT Pub. Date: Apr. 21, 2022

(65) Prior Publication Data
US 2023/0370883 A1    Nov. 16, 2023

Related U.S. Application Data

(60) Provisional application No. 63/091,716, filed on Oct. 14, 2020.

(51) Int. Cl.
*H04W 24/10* (2009.01)
*H04W 24/08* (2009.01)
*H04W 36/30* (2009.01)

(52) U.S. Cl.
CPC ........... *H04W 24/10* (2013.01); *H04W 24/08* (2013.01); *H04W 36/302* (2023.05)

(58) Field of Classification Search
CPC ....... H04W 36/0072; H04W 36/00226; H04W 36/144; H04W 36/304; H04W 76/10; H04W 36/0079; H04W 24/10
See application file for complete search history.

(56) References Cited

U.S. PATENT DOCUMENTS

2014/0099971 A1    4/2014 Lim et al.
2015/0032370 A1    1/2015 Garin
(Continued)

FOREIGN PATENT DOCUMENTS

| EP | 3197209 A1 | 7/2017 |
|---|---|---|
| WO | 2020/067826 A1 | 4/2020 |
| WO | 2022/129679 A1 | 6/2022 |

OTHER PUBLICATIONS

"3rd Generation Partnership Project; Technical Specification Group Radio Access Network; NR; Radio Resource Control (RRC) protocol specification (Release 16)", 3GPP TS 36.331, V16.0.0, Mar. 2020, pp. 1-835.

(Continued)

*Primary Examiner* — Mahran Y Abu Roumi
(74) *Attorney, Agent, or Firm* — Barta Jones, PLLC

(57) ABSTRACT

Systems, methods, apparatuses, and computer program products for utilizing user equipment (UE) detection of radio state conditions. For example, certain embodiments may detect and utilize knowledge of periodic line-of-sight (LOS)/non-LOS (NLOS) radio state changes to improve a network's handling of such radio states. In particular, a UE may be configured to observe LOS/NLOS radio state transitions over time. The UE may generate an estimate of when periodic radio state changes have occurred. The UE may report a prediction of a future LOS/NLOS radio state change based on the estimates of when the previous radio state (Continued)

changes have occurred. The predictions may be reported to the network as a measurement report.

11 Claims, 4 Drawing Sheets

(56) References Cited

U.S. PATENT DOCUMENTS

| | | | | |
|---|---|---|---|---|
| 2015/0338524 | A1* | 11/2015 | Ben Moshe | G01S 19/52 342/357.33 |
| 2016/0381610 | A1* | 12/2016 | Pu | H04W 36/0058 455/436 |
| 2017/0126379 | A1 | 5/2017 | Choi et al. | |
| 2017/0272998 | A1* | 9/2017 | Choi | H04W 36/0072 |
| 2018/0063754 | A1* | 3/2018 | Wang | H04W 36/00226 |

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

Portillo et al., "A Technical Comparison of Three Low Earth Orbit Satellite Constellation Systems to Provide Global Broadband", Acta Astronautica, vol. 159, Jun. 2019, pp. 1-16.

"3rd Generation Partnership Project; Technical Specification Group Radio Access Network; Study on New Radio (NR) to support non-terrestrial networks (Release 15)", 3GPP TR 38.811, V15.2.0, Sep. 2019, pp. 1-126.

Rieche et al., "Land Mobile Satellite Propagation Characteristics from Knife-Edge Diffraction Modeling and Hemispheric Images", 9th European Conference on Antennas and Propagation (EuCAP), Apr. 13-17, 2015, 4 pages.

"Handover Control and Adjacencies", Nokia Networks Oy, 2004, pp. 1-50.

Egea-Roca et al., "Transient change detection for LOS and NLOS discrimination at GNSS signal processing level", International Conference on Localization and GNSS (ICL-GNSS), Jun. 28-30, 2016, 6 pages.

"NLOS state due to vehicle blockage for V2X sidelink channel model", 3GPP TSG RAN WG1 Meeting #91, R1-1719843, Agenda: 7.8, Huawei, Nov. 27-Dec. 1, 2017, 7 pages.

International Search Report and Written Opinion received for corresponding Patent Cooperation Treaty Application No. PCT/EP2021/075460, dated Dec. 14, 2021, 14 pages.

Office action received for corresponding European Patent Application No. 21778038.6, dated Sep. 20, 2024, 8 pages.

Office action received for corresponding European Patent Application No. 21778038.6, dated Dec. 22, 2023, 8 pages.

* cited by examiner

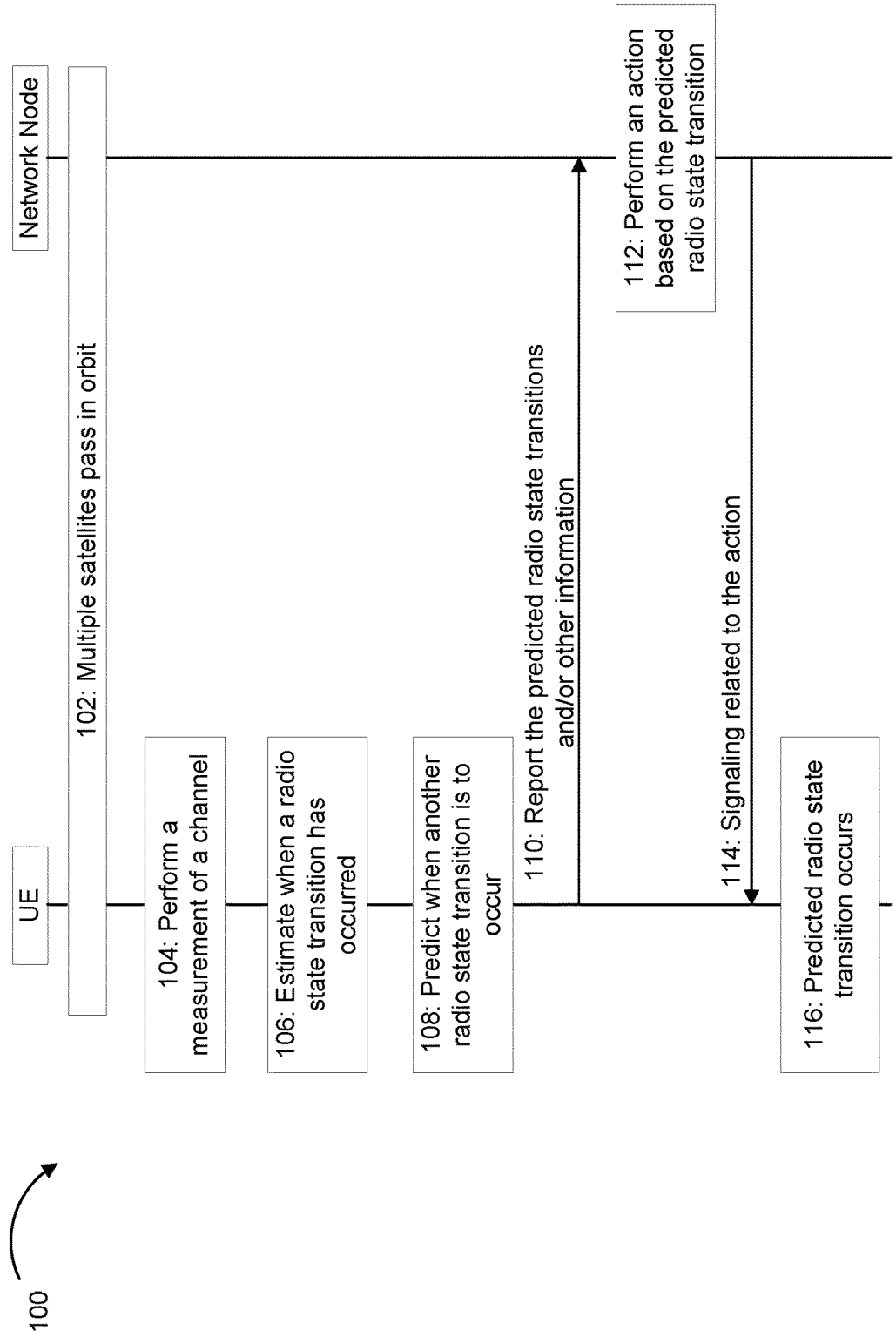

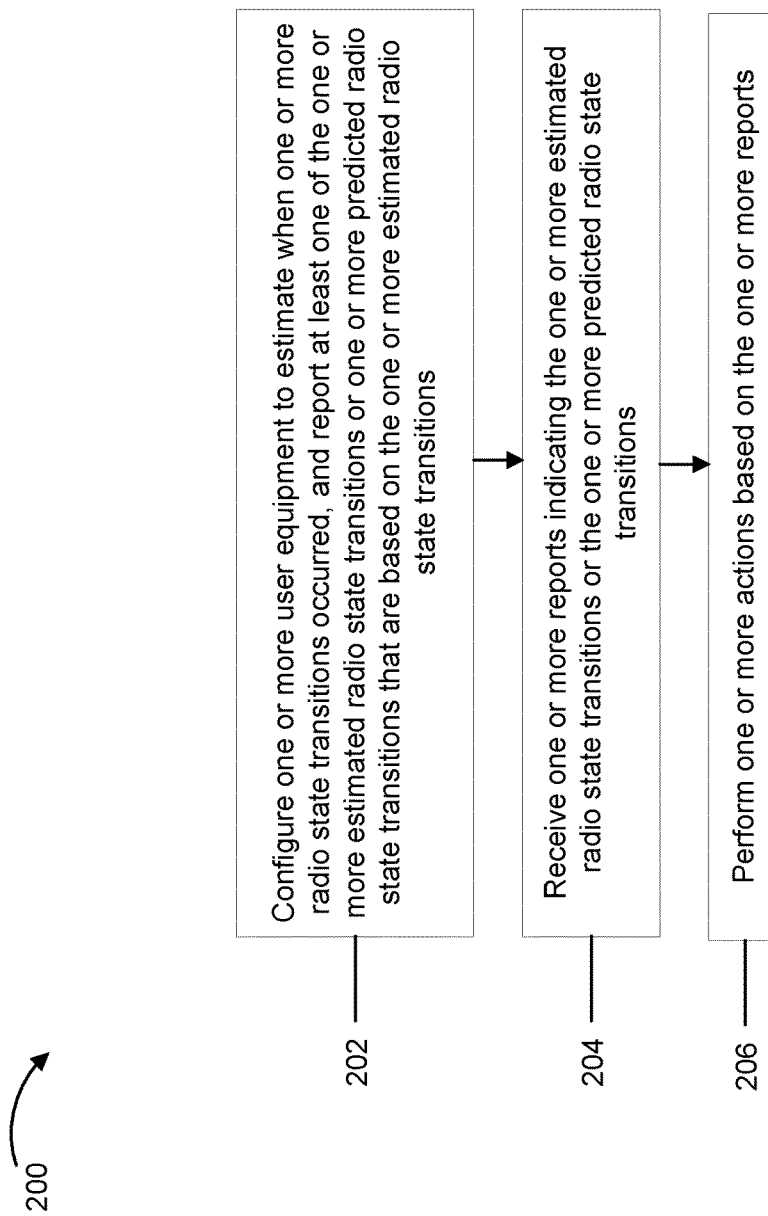

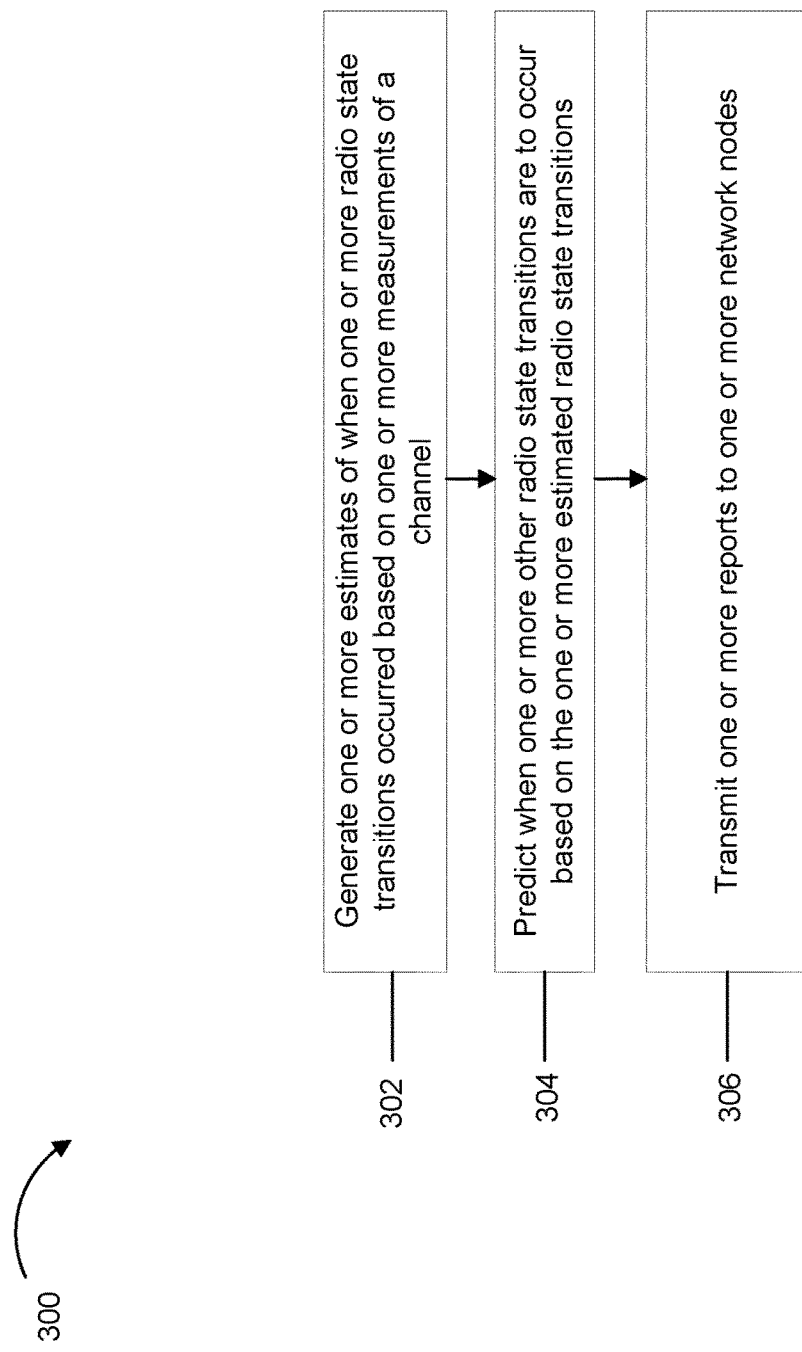

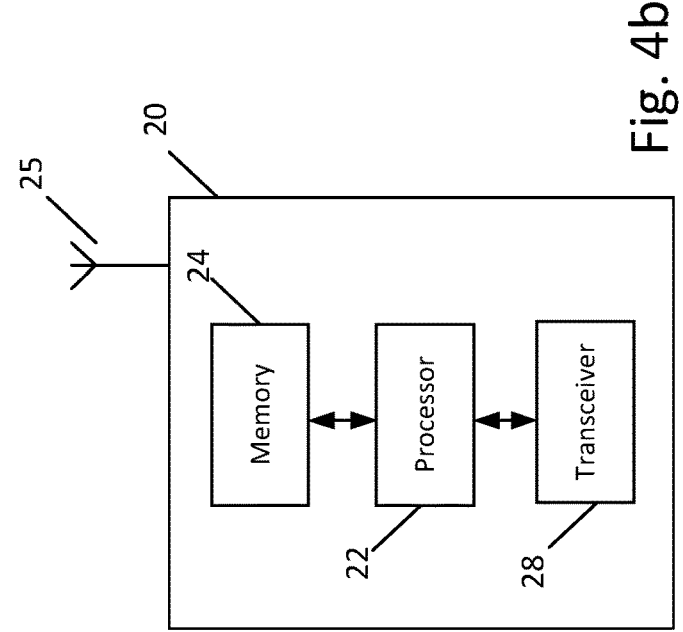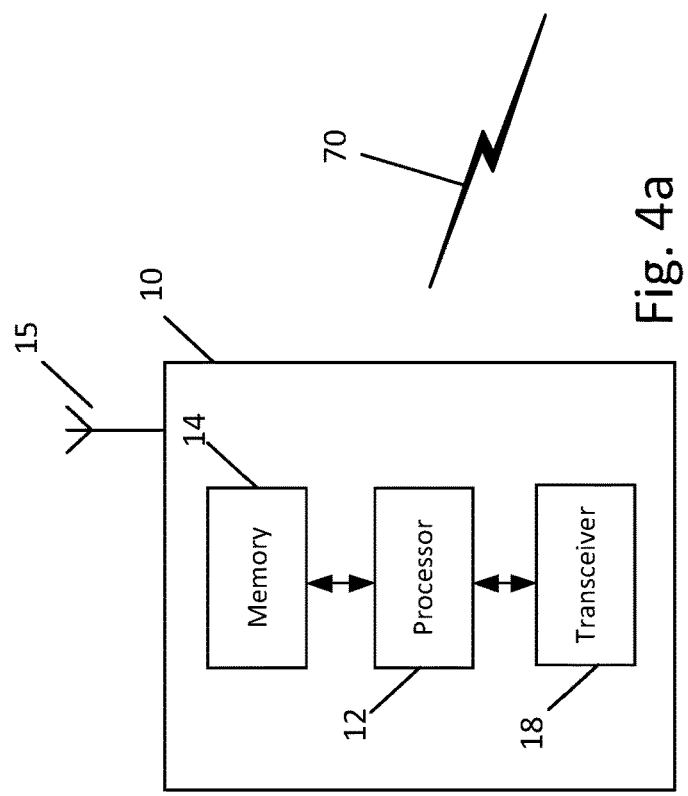

UTILIZING USER EQUIPMENT (UE) DETECTION OF RADIO STATE CONDITIONS

RELATED APPLICATION

This application claims priority to PCT Application No. PCT/EP2021/075460, filed on Sep. 16, 2021, which claims priority to U.S. Provisional Application No. 63/091,716 filed on Oct. 14, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for utilizing user equipment (UE) detection of radio state conditions.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include generating, by a user equipment, one or more estimates of when one or more radio state transitions occurred based on one or more measurements of a channel. The method may include predicting when one or more other radio state transitions are to occur based on the one or more estimated radio state transitions. The method may include transmitting one or more reports to one or more network nodes. The one or more reports may comprise the one or more predicted radio state transitions. The one or more reports may be associated with causing one or more actions to be performed.

In a variant, the one or more estimated radio state transitions or the one or more predicted radio state transitions may comprise one or more radio line-of-sight to non-line-of-sight radio state transitions or one or more radio non-line-of-sight to line-of-sight radio state transitions. In a variant, the method may include performing the one or more measurements of the channel, and the generating may include generating the one or more estimated radio state transitions based on the one or more measurements. In a variant, the method may include receiving a configuration associated with the estimating of the one or more radio state transitions or with the reporting of the one or more estimated radio state transitions or the one or more predicted radio state transitions.

In a variant, the one or more reports may further include identifiers for one or more cells with which the one or more estimated radio state transitions or the one or more predicted radio state transitions are associated. In a variant, the one or more reports may further include one or more parameters associated with the one or more estimated radio state transitions or the one or more predicted radio state transitions. In a variant, the one or more reports may further include one or more indicators of one or more mobility events of the user equipment. In a variant, the method may include determining that the one or more estimated radio state transitions or the one or more predicted radio state transitions are invalid based on the one or more measurements or the one or more mobility events. In a variant, the one or more actions may include applying dynamic discontinuous transmission or reception, pausing radio link monitoring, or modifying the radio link monitoring.

According to a second embodiment, a method may include configuring, by a network node, one or more user equipment to estimate when one or more radio state transitions occurred, and report at least one of: the one or more estimated radio state transitions, or one or more predicted radio state transitions that are based on the one or more estimated radio state transitions. The method may include receiving one or more reports indicating the one or more estimated radio state transitions or the one or more predicted radio state transitions. The method may include performing one or more actions based on the one or more reports.

In a variant, the one or more actions may include at least one of: modifying a data transfer, configuring a handover, modifying a scheduling, modifying a paging, instructing the one or more user equipment to apply dynamic discontinuous transmission or reception, or instructing the one or more user equipment to pause radio link monitoring or modify the radio link monitoring. In a variant, the configuring may include configuring measurement of a channel In a variant, the one or more estimated radio state transitions or the one or more predicted radio state transitions may be based on the measurement. In a variant, the one or more reports may include one or more parameters associated with the one or more estimated radio state transitions or the one or more predicted radio state transitions.

In a variant, the method may include generating a map of the one or more estimated radio state transitions or the one or more predicted radio state transitions and predicting, for one or more other user equipment, one or more radio state transitions based on the generated map. In a variant, the method may include notifying the one or more other user equipment about performance of the one or more actions. In a variant, the one or more reports may include one or more indicators of one or more mobility events of the one or more user equipment. In a variant, the configuring may include configuring the one or more user equipment to determine that the one or more estimated radio state transitions or the one or more predicted radio state transitions are invalid based on one or more measurements or one or more mobility events. In a variant, the method may include transmitting, to the one or more user equipment, an indication of the one or more actions.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 1 illustrates an example signal diagram for utilizing UE detection of radio state conditions, according to some embodiments;

FIG. 2 illustrates an example flow diagram of a method, according to some embodiments;

FIG. 3 illustrates an example flow diagram of a method, according to some embodiments;

FIG. 4a illustrates an example block diagram of an apparatus, according to an embodiment; and FIG. 4b illustrates an example block diagram of an apparatus, according to another embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for utilizing UE detection of radio state conditions is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

5G NR may be enabled to use non-terrestrial networks (NTN). One of the objectives of NTN may include how to utilize low-earth orbit (LEO) satellites, operating in an altitude of approximately 500-1500 kilometers (km). At this height, the satellites may move with a relative speed to Earth of about 7.5 kilometers per second (km/s), which may cause frequent mobility events and varying radio conditions even for stationary UEs. The LEO satellites may be expected to provide coverage to a limited area on Earth. A typical cell size may be about 50 km and a satellite may have on the order of tens of cells in certain scenarios (more or fewer cells may be provided in other scenarios). Due to a limited coverage area per satellite, the satellites may be expected to form a constellation of orbits, where numerous satellites are located in various orbits. As an example, some constellations of satellites may have up to 100 satellites per orbit and up to 100 orbits.

The NTN deployment scenarios may include both remote/rural areas and urban environments. NTN deployments may be used in remote and rural areas to provide communications coverage where there is no terrestrial coverage, while NTN deployments in urban environments may provide communications coverage for disaster relief services. Both scenarios may have challenging radio propagation conditions in the sense that the direct radio path between the transmitter and receiver may be blocked, e.g., by foliage or buildings. Estimates of line-of-sight (LOS) probability may be a function of the radio environment and the elevation angle between satellite and UE. Table 1 below provides an example of these estimates. For example, Table 1 provides the LOS probability, which at low elevation angles can be 25-40 percent (%), while it approaches 100% for the case where the satellite is directly above the UE (90 degrees (°) elevation angle).

| Elevation | Dense urban Scenario | Urban Scenario | Suburban and Rural Scenarios |
|---|---|---|---|
| 10° | 28.2% | 24.6% | 78.2% |
| 20° | 33.1% | 38.6% | 86.9% |
| 30° | 39.8% | 49.3% | 91.9% |
| 40° | 46.8% | 61.3% | 92.9% |
| 50° | 53.7% | 72.6% | 93.5% |
| 60° | 61.2% | 80.5% | 94.0% |
| 70° | 73.8% | 91.9% | 94.9% |

| Elevation | Dense urban Scenario | Urban Scenario | Suburban and Rural Scenarios |
|---|---|---|---|
| 80° | 82.0% | 96.8% | 95.2% |
| 90° | 98.1% | 99.2% | 99.8% |

Estimates for shadow fading, clutter loss, and fast fading parameters may be a function of the elevation angle, carrier frequency, propagation scenario and LOS/non-LOS (NLOS) states. Propagation conditions in NLOS may be significantly worse than LOS. For example, path gain can decrease by as much as 20 decibels (dB) when moving from LOS to NLOS.

A stationary UE may be subject to periodic LOS and NLOS radio channels caused by satellites in the same orbit passing over the UE. As previously noted, the path gain may change between LOS and NLOS scenarios, which may negatively impact the performance of a communications channel, especially because NTN may already be operating with a challenging link budget. For example, a sudden drop in signal power may negatively impact scheduling and mobility decisions. As such, there is a need for improved communications with respect to LOS and NLOS scenarios (e.g., in NTN deployments).

Some embodiments described herein may provide for utilizing UE detection of radio state conditions. For example, certain embodiments may detect and utilize knowledge of periodic LOS/NLOS radio state changes (or transitions) to improve a network's handling of such radio states. In particular, a UE may be configured to observe LOS/NLOS radio state transitions over time. The UE may generate an estimate of when periodic radio state changes have occurred. The UE may report a prediction of a future LOS/NLOS radio state change based on the estimates of when the previous radio state changes have occurred. The predictions may be reported to the network as a measurement report. By receiving information about the radio state change prior to the event, the network may react in time to a radio state change (e.g., by configuring a (conditional) handover, changing scheduling parameters, or delaying paging information). For example, the network may postpone a data transfer or paging message until better signalling conditions become available after a certain amount of time.

The observations and/or the estimates may be measured on the serving cell and/or on a secondary cell or neighbor cell. Therefore, in addition to sending the predictions, the UE may additionally report information on which cell (e.g., physical cell identifier (PCI)) the prediction applies. In the default configuration, the prediction may relate to the serving cell and there may be no need to include the PCI. But if the prediction is describing the link towards a secondary or neighbour cell, the PCI may be provided to the network.

FIG. 1 illustrates an example 100 of utilizing UE detection of radio state conditions (e.g., LOS or NLOS conditions), according to some embodiments. The example 100 includes a UE and a network node (e.g., a gNB). As illustrated at 102, multiple satellites may be passing over the UE and the network node in orbit. For example, the multiple satellites may be in a constellation of satellites in an NTN deployment scenario, similar to that described elsewhere herein. As illustrated at 104, the UE may perform a measurement of a channel. For example, the UE may perform a path gain measurement of a channel between the UE and the network node.

In some embodiments, the network node may configure the UE to perform the measurement. For example, the network node may configure the UE measurement by defining a measurement periodicity, a minimum power offset between LOS and NLOS conditions (e.g., the minimum power loss a UE may observe to determine that a NLOS radio state transition has occurred), a sliding window for the measurement, and/or the like. With respect to the sliding window, the UE may apply the sliding window to compare the most recent measurement with a past measurement. In certain embodiments, values within a second window (time-to-trigger) may have to be below or above a power offset in order for the UE to determine a radio state transition (e.g., from a LOS condition to a NLOS condition, or vice versa). Such measurement configurations may be used to construct a measurement event trigger, which may cause the UE to report the expected LOS/NLOS change as an early measurement report. In this way, by performing a measurement of the channel, the UE may observe one or more radio state transitions.

As illustrated at 106, the UE may estimate when a radio state transition has previously occurred based on the measurement and/or observing one or more radio state transitions. For example, the UE may estimate that a radio state transition has occurred when a measurement value satisfies a threshold or experiences a change that satisfies a threshold. In addition to estimating that a radio state transition has occurred, the UE may determine the type of radio state transition that has occurred. For example, the UE may determine that the radio state has changed from LOS to NLOS based on the measurement value dropping below a threshold or experiencing a decrease that exceeds a threshold, or may determine that the radio state has changed from NLOS to LOS based on the measurement value increasing above a threshold or experiencing an increase that exceeds a threshold. In some embodiments, the estimated radio state transition may be for the serving network node and/or for one or more other network nodes, such as a secondary network node or a neighboring network node.

As illustrated at 108, the UE may predict when another radio state transition is to occur. For example, the UE may predict when another radio state transition is to occur based on an estimated radio state transition, such as a time that the radio state transition occurred, a location of a satellite above the Earth where the radio state transition occurred, and/or the like.

As illustrated at 110, the UE may report the predicted radio state transitions and/or other information to the network node. For example, the UE may report the predicted radio state transitions and/or estimated radio state transitions to the network node prior to the time that the radio state transition is predicted to occur. In some embodiments, the network node may configure the UE to provide the report(s) described herein in a particular manner (e.g., how long in advance to provide the report prior to a predicted radio state transition).

The report may further include information identifying the cell or node on which the predicted radio state transition is to occur (e.g., may include a PCI for the cell). Additionally, or alternatively, the report may further include one or more parameters related to the estimated radio state transition or the predicted radio state transition. For example, the report may include the estimated radio state transitions, expected durations of predicted radio state transitions, an expected decrease/increase in received signal power during a radio state transition, expected mobility events during a radio state transition, an expected duration of radio state transitions after a mobility event, a likelihood of the event (e.g., a number of past events that were used to make the estimate), and/or the like. This information and/or the information identifying the cell or node may be provided in separate report(s) from the report of the predicted radio state transition (e.g., may be provided in an event-triggered measurement report (for handover)).

Instead of relying on the UE to accurately predict radio state transitions, the UE may be configured to report the estimated radio state transitions rather than predicted radio state transitions. For example, the UE may be configured to report a system frame number (SFN)/absolute time where a radio state change was observed (or the UE may report the expected LOS time per satellite pass-over). Using such information, the network node may determine a radio state transition (shadow) map. If there are a sufficient number of UEs in the area, the network node may predict the radio state transitions for the UE and/or for one or more other nearby UEs. In some embodiments, the UE may have the capability to obtain its location based on global navigation satellite system (GNSS) data. With this information, the network node may then inform other UEs in the same location/area about the expected radio state transition.

Another use of the GNSS capability may include having the UE set a flag/indicator in a report if the UE detects that the UE has moved indoors. This type of mobility event may result in, for example, a NLOS radio state, but the duration and periodicity may no longer match prior estimates. In this way, the GNSS flag may be used to indicate mobility, which may cause the network node to rely less on the reported predicted radio state transitions. As one example, the compass functionality of the UE's GNSS may be used to detect if the UE's orientation has changed (e.g., the user has turned). The network node may also configure some validity measures in the UE, e.g., maximum movement distance or maximum angular rotation, before the UE considers past measurements invalid with respect to the current position.

In certain embodiments, UEs known to be static (e.g., in an array of sensors in a remote area) or that can estimate the lack of movement for long periods of time (quasi-static position), either from GNSS or other means, can use this knowledge to save some time.

For example, some UEs may be located in an area where energy is a limited resource. In these embodiments, the UE may utilize the information of, for example, LOS/NLOS predictions to avoid accessing the network when a high transmit power and/or a high number of repetitions are needed. Likewise, the UE may modulate its discontinuous reception (DRX) settings to monitor the network when there is an available LOS signal. In certain embodiments, this information can be transmitted to the network node such that both the UE and the network node have the same understanding about the DRX settings.

In some embodiments, the network node may configure the UE to store radio state transition logs/observations for a certain duration (e.g., 30 minutes, 2 hours, etc.) and, upon network node request, report the observations. The observations may include the PCI and radio state transition time of stay and transition time, either in condensed (e.g., average across the observations) or full (all observations within the specified duration) format.

As illustrated at 112, the network node may perform an action based on the predicted radio state transition. For example, the action may include modifying a data transfer, configuring a handover, modifying a scheduling, modifying a paging, instructing the UE to apply dynamic discontinuous transmission or reception, or instructing the UE to pause radio link monitoring or modify the radio link monitoring. For example, when the UE has sent the report to the network node, the network node may instruct the UE to apply dynamic discontinuous transmission/reception during an NLOS radio state because the network node may know when the UE is expected to be unavailable. As another example, the network node may respond with a handover configuration for the UE, but since the next serving satellite may not be available yet, the configuration may inform the UE to pause/wait for a period of time. This functionality can be facilitated using conditional handover. In some embodiments, the UE may perform one or more actions at the time of a predicted radio state transition based on instructions from the network node or autonomously without being instructed to perform the one or more actions. For example, when the UE has sent the report to the network node that predicts an NLOS in X seconds, the UE may pause radio link monitoring after X seconds when the UE is expected to be unavailable and until the LOS state is predicted to return.

As illustrated at 114, the network node may transmit, and the UE may receive, signalling related to the action. For example, the network node may transmit an indication of the action that the network node performed. As illustrated at 116, the predicted radio state transition may occur.

Certain embodiments described herein may apply to both radio resource control (RRC) connected and/or RRC idle/inactive mode UEs. However, since more signalling may be used for a RRC idle/inactive UE to send the information, a network node, which has previously received the information from a RRC connected UE, may apply the information to the UE if it becomes RRC idle/inactive, e.g., to control when to send a paging message. This helps to prevent excessive use of signalling with certain embodiments described herein.

In some embodiments, the UE may determine that the estimated radio state transition or the predicted radio state transition are invalid (e.g., based on measurements and/or mobility events). For example, since certain embodiments apply to NTN scenarios, the Earth's rotation may present certain challenges. In particular, the Earth's rotation may result in the satellite orbits to drift over time (e.g., each satellite pass (of the same orbit) may be offset compared to the prior pass of the previous satellite). Therefore, the estimates or predictions described herein may be valid just for a certain number of satellites (or a certain amount of time), which may depend on the satellite's altitude, the number of satellites per orbit, the number of orbits, and/or the like. However, the issue may be addressed by configuring a moving average of the estimate, such that the report is based on a certain number of prior passes. In some embodiments, the network may signal filtering coefficients to the UE. In other embodiments, the UE may determine this based on data related to the constellation and the actual measurements of the satellites. In some embodiments, compensating for the drift may include relating measurements and/or estimates to azimuth angle and elevation angle, and the UE may use this for grouping and/or to determine when a new orbit is used.

At some point the satellites of the orbit may have drifted so far relative to the UE's position that the UE may utilize satellites of the next orbit. At this point, the UE either may restart the estimation (e.g., may re-perform at least operations 104 through 108) or may utilize the first estimates determined at 106, which were generated at the previous orbit switch.

Although certain embodiments have been described in the context of NTN, certain embodiments may be applied in other scenarios, such as high-speed train or millimeter wave (mmWave) deployments, where there are regular network layouts or predictable and periodic events.

As described above, FIG. 1 is provided as an example. Other examples are possible, according to some embodiments.

FIG. 2 illustrates an example flow diagram of a method 200, according to some embodiments. For example, FIG. 2 shows example operations of a network node (e.g., apparatus 10 illustrated in, and described with respect to, FIG. 4a). Some of the operations illustrated in FIG. 2 may be similar to some operations shown in, and described with respect to, FIG. 1.

In an embodiment, the method may include, at 202, configuring one or more user equipment to estimate when one or more radio state transitions occurred, and report at least one of the one or more estimated radio state transitions or one or more predicted radio state transitions that are based on the one or more estimated radio state transitions. The method may include, at 204, receiving one or more reports indicating the one or more estimated radio state transitions or the one or more predicted radio state transitions, for example, in a manner similar to that described at 110 of FIG. 1. The method may include, at 206, performing one or more actions based on the one or more reports, for example, in a manner similar to that described at 112 of FIG. 1.

The method illustrated in FIG. 2 may include one or more additional aspects described below or elsewhere herein. In some embodiments, the one or more actions may include at least one of modifying a data transfer, configuring a handover, modifying a scheduling, modifying a paging, instructing the one or more user equipment to apply dynamic discontinuous transmission or reception, or instructing the one or more user equipment to pause radio link monitoring or modify the radio link monitoring. In some embodiments, the configuring of 202 may include configuring measurement of a channel. The one or more estimated radio state transitions or the one or more predicted radio state transitions may be based on the measurement. In some embodiments, the one or more reports may include one or more parameters associated with the one or more estimated radio state transitions or the one or more predicted radio state transitions.

In some embodiments, the method may include generating a map of the one or more estimated radio state transitions or the one or more predicted radio state transitions and predicting, for one or more other user equipment, one or more radio state transitions based on the generated map. In some embodiments, the method may include notifying the one or more other user equipment about performance of the one or more actions. In some embodiments, the one or more reports may include one or more indicators of one or more mobility events of the one or more user equipment. In some embodiments, the configuring of 202 may include configuring the one or more user equipment to determine that the one or more estimated radio state transitions or the one or more predicted radio state transitions are invalid based on one or more measurements or one or more mobility events. In some embodiments, the method may include transmitting, to the one or more user equipment, an indication of the one or more actions, for example, in a manner similar to that described at 114 of FIG. 1.

As described above, FIG. 2 is provided as an example. Other examples are possible according to some embodiments.

FIG. 3 illustrates an example flow diagram of a method 300, according to some embodiments. For example, FIG. 3 shows example operations of a UE (e.g., apparatus illustrated in, and described with respect to, FIG. 4b). Some of the operations illustrated in FIG. 3 may be similar to some operations shown in, and described with respect to, FIG. 1.

In an embodiment, the method may include, at 302, generating one or more estimates of when one or more radio state transitions occurred based on one or more measurements of a channel, for example, in a manner similar to that described at 106 of FIG. 1. The method may include, at 304, predicting when one or more other radio state transitions are to occur based on the one or more estimated radio state transitions, for example, in a manner similar to that described at 108 of FIG. 1. The method may include, at 306, transmitting one or more reports to one or more network nodes, for example, in a manner similar to that at 110 of FIG. 1. The one or more reports may include the one or more predicted radio state transitions. The one or more reports may be associated with causing one or more actions to be performed.

The method illustrated in FIG. 3 may include one or more additional aspects described below or elsewhere herein. In some embodiments, the one or more estimated radio state transitions or the one or more predicted radio state transitions may comprise one or more radio line-of-sight to non-line-of-sight radio state transitions or one or more radio non-line-of-sight to line-of-sight radio state transitions. In some embodiments, the method may include performing the one or more measurements of the channel (e.g., in a manner similar to that at 104 of FIG. 1), and the generating of 302 may include generating the one or more estimated radio state transitions based on the one or more measurements. In some embodiments, the method may include receiving a configuration associated with the estimating of the one or more radio state transitions or with the reporting of the one or more estimated radio state transitions or the one or more predicted radio state transitions.

In some embodiments, the one or more reports may further include identifiers for one or more cells with which the one or more estimated radio state transitions or the one or more predicted radio state transitions are associated. In some embodiments, the one or more reports further include one or more parameters associated with the one or more estimated radio state transitions or the one or more predicted radio state transitions. In some embodiments, the one or more reports may further include one or more indicators of one or more mobility events of the user equipment. In some embodiments, the method may include determining that the one or more estimated radio state transitions or the one or more predicted radio state transitions are invalid based on the one or more measurements or the one or more mobility events. In some embodiments, the one or more actions may include applying dynamic discontinuous transmission or reception, pausing radio link monitoring, or modifying the radio link monitoring.

As described above, FIG. 3 is provided as an example. Other examples are possible according to some embodiments.

FIG. 4a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1 and 2. For instance, apparatus 10 may be controlled by memory 14 and processor 12 to perform the method of FIG. 2.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1 and 3. For instance, in one embodiment, apparatus 20 may be controlled by memory 24 and processor 22 to perform the method of FIG. 3.

In some embodiments, an apparatus (e.g., apparatus 10 and/or apparatus 20) may include means for performing a method or any of the variants discussed herein, e.g., a method described with reference to FIGS. 2 and 3. Examples of the means may include one or more processors, memory, and/or computer program code for causing the performance of the operation.

Therefore, certain example embodiments provide several technological improvements, enhancements, and/or advantages over existing technological processes. For example, some benefits of some example embodiments are confinement of data transfers to LOS conditions (or in NLOS conditions, the modulation and coding scheme (MCS) may be made more conservative), network configuration of handover and/or multi-connectivity before an NLOS radio state occurs, obtainment of energy saving by the UE by applying DRX/discontinuous transmission (DTX) during NLOS radio states, and/or delaying of paging from the network until a LOS radio state. Accordingly, the use of some example embodiments results in improved functioning of communications networks and their nodes and, therefore constitute an improvement at least to the technological field of network communications, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

LOS Line-of-Sight
NLOS Non-Line-of-Sight
UE User Equipment

What is claimed is:
1. A method, comprising:
receiving, by a user equipment (UE) from a network node via radio resource control signaling, a configuration comprising a measurement periodicity, a minimum power offset of 20 decibels between line-of-sight and non-line-of-sight radio state transitions, and a reporting lead time indicating how many milliseconds prior to a predicted line-of-sight and non-line-of-sight radio state transition;
performing, by the UE, path gain measurements of a service cell channel between the UE and the network node using a sliding window and a time-to-trigger window defined by the received configuration;

generating, by the UE, estimates of when periodic line-of-sight to non-line-of-sight radio state transitions and periodic non-line-of-sight to line-of-sight radio state transitions occurred based on the path gain measurements of the service cell channel, wherein an estimated line-of-sight to non-line-of-sight radio state transition is determined when a measured path gain falls below the minimum power offset threshold for a duration of the time-to-trigger window, and wherein an estimated non-line-of-sight to non-line-of-sight transition is determined when the measured path gain rises above the minimum power offset threshold for the duration of the time-to-trigger window;

predicting, by the UE, a next radio state transition based on a periodicity of prior radio state transitions, including a system frame number;

transmitting, by the UE to the network node, a measurement report comprising: the predicted radio state transition, an identifier of the service cell, an expected duration of the predicted radio state transition, and a likelihood value derived from a number of the prior radio state transitions; and performing, by the UE, actions based on the predicted radio state transition, wherein the actions comprise:
applying dynamic discontinuous reception during a predicted non-line-of-sight state,
pausing radio link monitoring for the predicted non-line-of-sight state, and
resuming the radio link monitoring when the line-of-sight state is predicted to return.

2. The method according to claim 1, wherein the measurement report further comprises one or more indicators of one or more mobility events of the user equipment.

3. The method according to claim 2, further comprising:
determining, by the UE, that the estimated radio state transitions or the predicted radio state transition are invalid based on the path gain measurements and the one or more mobility events.

4. A method, comprising:
configuring, by a network node via radio resource control signaling, a user equipment (UE) to;
perform path gain measurements of a serving cell channel between the UE and the network node;
apply a sliding window and time-to-trigger window to compare the path gain measurements, and
estimate, based on the path gain measurements, when periodic radio state transitions occurred, wherein the estimated periodic radio state transitions comprise one or more line-of-sight to non-line-of-sight radio state transitions or one or more non-line-of-sight to line-of-sight radio state transitions, wherein an estimated line-of-sight to non-line-of-sight radio state transition is determined when a measured path gain decreases by at least 20 decibels relative to a prior measurement and remains below a configured threshold for a duration of the time-to-trigger window, and an estimated non-line-of-sight to line-of-sight radio state transition is determined when the measured path gain increases by at least 20 dB relative to the prior measurement and remains above the configured threshold for the duration of the time-to-trigger window; and
configuring the UE to report:
a system frame number or absolute time of at least one prior estimated line-of-sight to non-line-of-sight radio state transition and non-line-of-site to line-of-sight radio state transition;
the estimated radio state transitions, and
one or more predicted radio state transitions determined from a periodicity of prior estimated radio state transitions, a physical cell identifier of a cell to which the prediction applies, an expected duration of the predicted radio state transition, and a likelihood value representing a number of past transitions used to make the prediction, and
wherein the configuring comprises defining a measurement periodicity, a minimum power offset between line-of-sight and non-line-of-sight radio state transitions, and a reporting lead time prior to a predicted radio state transition;

receiving, by the network node, a report comprising the estimated periodic radio state transitions or the one or more predicted radio state transitions; and performing, by the network node, actions based on the one or more reports, wherein the actions comprise:
suspending a data transfer,
configuring a conditional handover,
modifying a scheduling,
delaying a paging message,
instructing the UE to apply dynamic discontinuous reception during a predicted non-line-of-sight state, and
instructing the UE to pause radio link monitoring during the predicted non-line-of-sight state and resume radio link monitoring when the predicted line-of-sight state returns.

5. The method according to claim 4, wherein the report comprises one or more parameters associated with the estimated periodic radio state transitions or the one or more predicted radio state transitions.

6. The method according to claim 5, further comprising:
generating, by the network node, a map of the one or more estimated radio state transitions or the one or more predicted radio state transitions; and
predicting, by the network node, for one or more other UEs, one or more radio state transitions based on the generated map.

7. The method according to claim 6, further comprising:
notifying, by the network node, the one or more other UEs about performance of the actions.

8. The method according to claim 7, wherein the report further comprise one or more indicators of one or more mobility events of the one or more UEs.

9. The method according to claim 8, wherein the configuring of the one or more user equipment further comprises:
configuring the one or more UEs to determine that the one or more estimated radio state transitions or the one or more predicted radio state transitions are invalid based on at least one of one or more measurements and one or more mobility events.

10. The method according to claim 8, further comprising:
transmitting, by the network node, to the one or more UEs, an indication of the actions.

11. A user equipment (UE), comprising:
at least one processor; and
at least one memory comprising computer program code, the at least one memory and the computer program code configured, with the at least one processor, to cause the UE at least to perform;
receiving, from a network node via radio resource control signaling, a configuration comprising a measurement periodicity, a minimum power offset of 20 decibels between line-of-sight and non-line-of-sight radio state transitions, and a reporting lead time indicating how many milliseconds prior to a predicted line-of-sight and non-line-of-sight radio state transition;

performing path gain measurements of a service cell channel between the UE and the network node using a sliding window and a time-to-trigger window defined by the received configuration;

generating estimates of when periodic line-of-sight to non-line-of-sight radio state transitions and periodic non-line-of-sight to line-of-sight radio state transitions occurred based on the path gain measurements of the service cell channel, wherein an estimated line-of-sight to non-line-of-sight radio state transition is determined when a measured path gain falls below the minimum power offset threshold for a duration of the time-to-trigger window, and wherein an estimated non-line-of-sight to non-line-of-sight transition is determined when the measured path gain rises above the minimum power offset threshold for the duration of the time-to-trigger window;

predicting a next radio state transition based on a periodicity of prior radio state transitions, including a system frame number;

transmitting, to the network node, a measurement report comprising: the predicted radio state transition, an identifier of the service cell, an expected duration of the predicted radio state transition, and a likelihood value derived from a number of the prior radio state transitions; and performing actions based on the predicted radio state transition, wherein the actions comprise:
  applying dynamic discontinuous reception during a predicted non-line-of-sight state,
  pausing radio link monitoring for the predicted non-line-of-sight state, and
  resuming the radio link monitoring when the line-of-sight state is predicted to return.

* * * * *